(12) United States Patent
Klouzal

(10) Patent No.: US 9,849,742 B2
(45) Date of Patent: Dec. 26, 2017

(54) MANEUVERABLE PLATFORMS

(71) Applicant: Theodore J. Klouzal, Chatsworth, CA (US)

(72) Inventor: Theodore J. Klouzal, Chatsworth, CA (US)

(*) Notice: Subject to any disclaimer, the term of this patent is extended or adjusted under 35 U.S.C. 154(b) by 0 days.

(21) Appl. No.: 15/190,036

(22) Filed: Jun. 22, 2016

(65) Prior Publication Data

US 2016/0375737 A1 Dec. 29, 2016

Related U.S. Application Data

(60) Provisional application No. 62/185,423, filed on Jun. 26, 2015.

(51) Int. Cl.
| | |
|---|---|
| *B60F 3/00* | (2006.01) |
| *B63B 38/00* | (2006.01) |
| *B63H 1/04* | (2006.01) |
| *B63H 1/38* | (2006.01) |
| *B63H 25/42* | (2006.01) |

(52) U.S. Cl.
CPC .......... *B60F 3/0007* (2013.01); *B60F 3/0038* (2013.01); *B63B 38/00* (2013.01); *B63H 1/04* (2013.01); *B63H 1/38* (2013.01); *B63H 25/42* (2013.01)

(58) Field of Classification Search
CPC ........ B60F 3/00; B60F 3/0007; B60F 3/0038; B60F 3/003; B63H 21/12; B63B 38/00; B63B 35/00; B60K 7/00
USPC ...................................................... 440/12.66
See application file for complete search history.

(56) References Cited

U.S. PATENT DOCUMENTS

| | | | |
|---|---|---|---|
| 2,946,625 | A | 7/1960 | Crain et al. |
| 3,238,913 | A | 3/1966 | Slemmons et al. |
| 3,298,348 | A | 1/1967 | Sanders et al. |
| 3,557,398 | A | 1/1971 | Pierce |
| 3,628,493 | A | 12/1971 | Headrick |
| 3,895,596 | A | 7/1975 | Amour |
| 4,273,544 | A | 6/1981 | Smith et al. |

(Continued)

FOREIGN PATENT DOCUMENTS

| | | |
|---|---|---|
| CN | 101528487 A | 9/2009 |
| CN | 103405915 A | 11/2013 |

(Continued)

*Primary Examiner* — Lars A Olson
(74) *Attorney, Agent, or Firm* — KPPB LLP

(57) ABSTRACT

A maneuverable platform capable of operating on both fluid bodies (e.g., lakes, rivers, oceans, etc. in either liquid or frozen form) and land is provided. The platform has an above water portion formed of one or more sections onto discrete sections of which are positioned a number of buoyant propulsion members configured to support the above water portion and engage a fluid body or the ground to collectively provide support, propulsion and steering for the platform. The buoyant propulsion members are configured such that they provide buoyancy to the platform when the platform is at rest and lift when the platform reaches a specified hydrodynamic speed such that the platform planes atop the fluid of the fluid body during operation. The maneuverable platform, including the above water portion and the buoyant propulsion members, may be modular such that the platform may be split into sections of predetermined configuration to operate independently.

18 Claims, 12 Drawing Sheets

(56) References Cited

U.S. PATENT DOCUMENTS 4,842,561 A     6/1989 Perrone
7,850,252 B2 * 12/2010 Mills .................... B60B 15/025
                                                       440/12.66

FOREIGN PATENT DOCUMENTS

| DE | 202011100501 U1 | 8/2011 |
| FR | 2924678 B1 | 3/2012 |
| JP | 58043809 B | 9/1983 |
| JP | 2005112224 A | 4/2005 |
| WO | 8202364 | 7/1982 |

\* cited by examiner

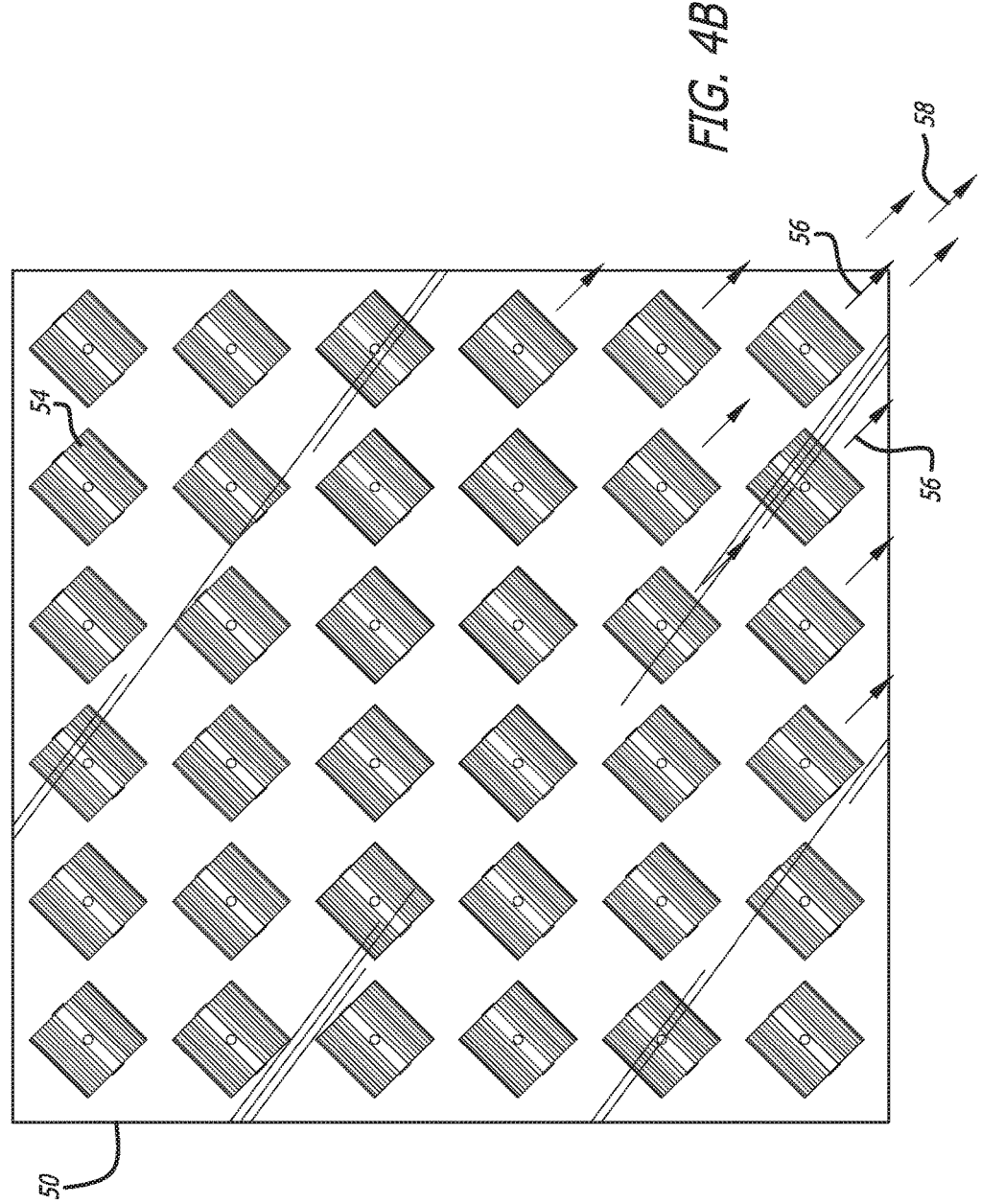

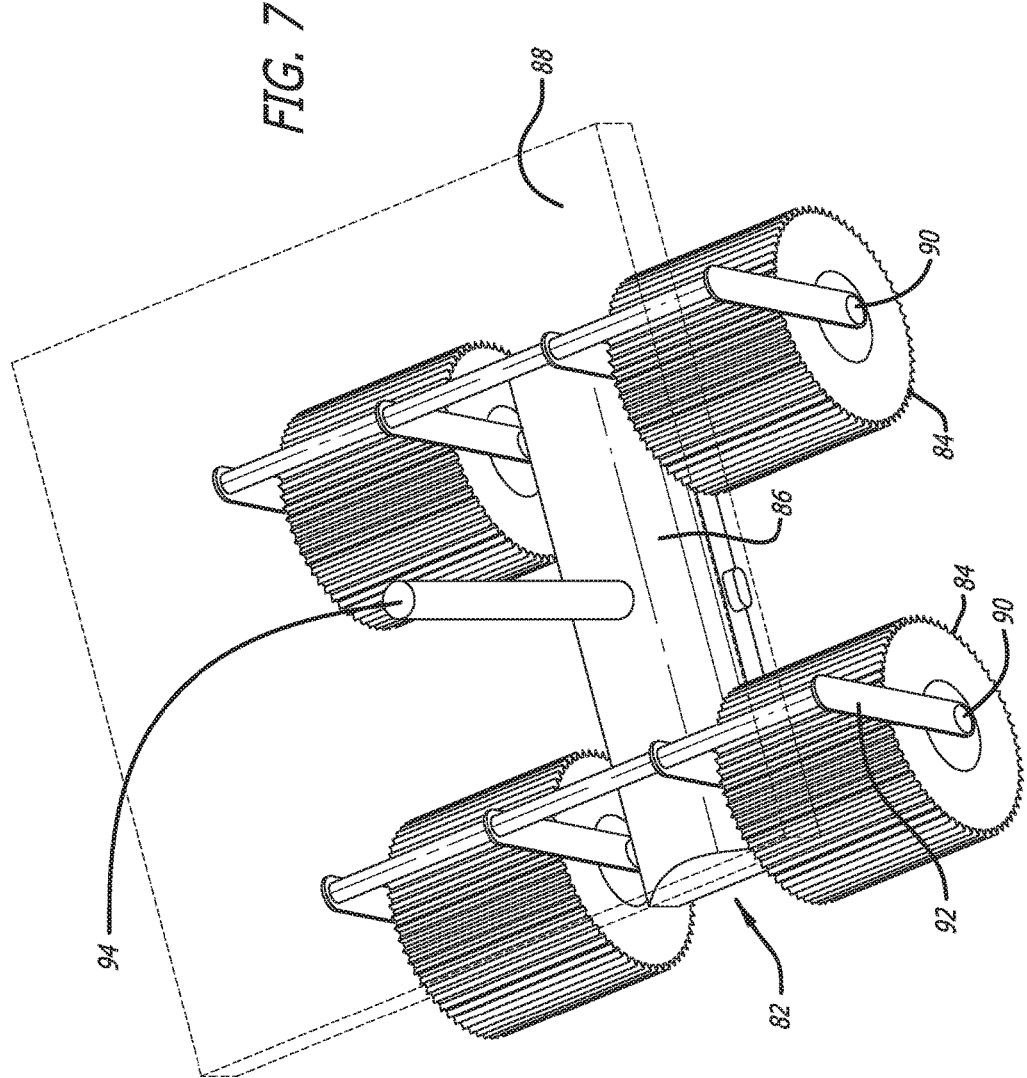

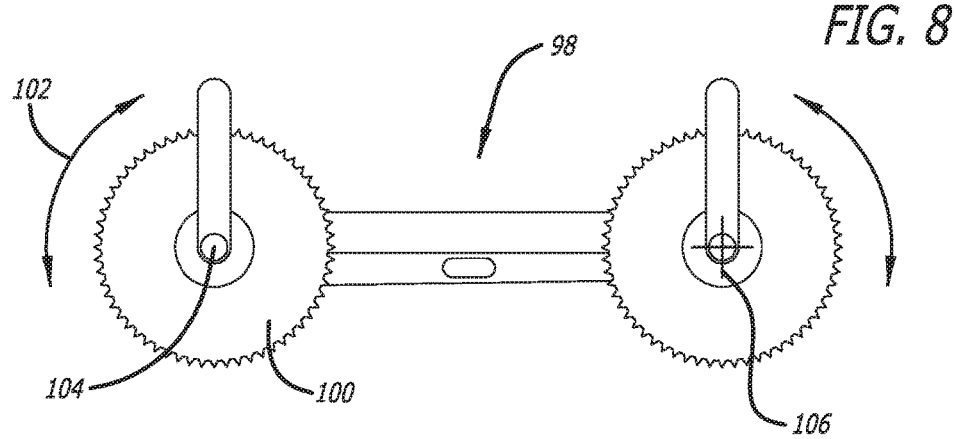
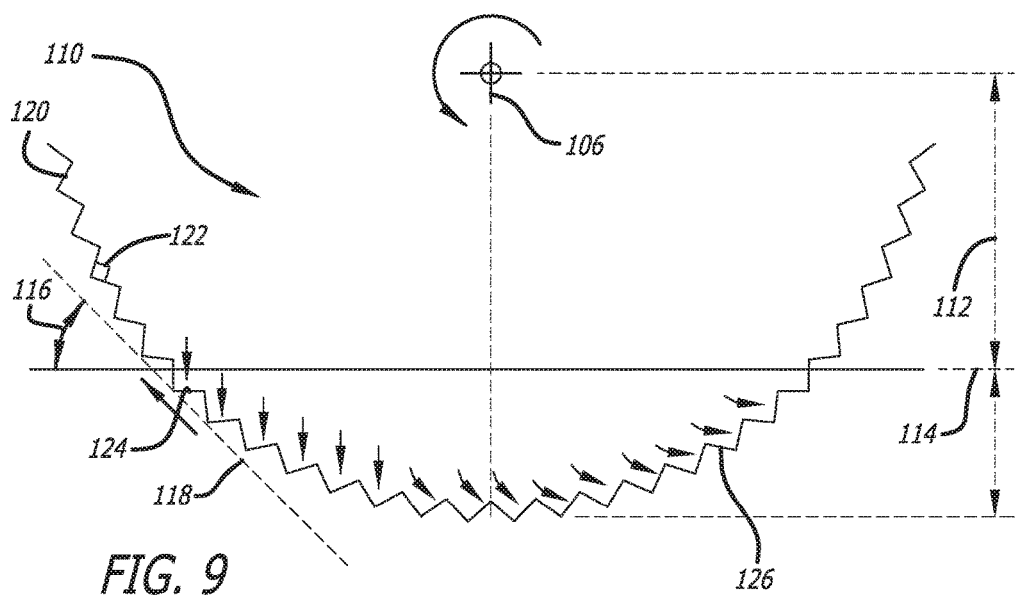

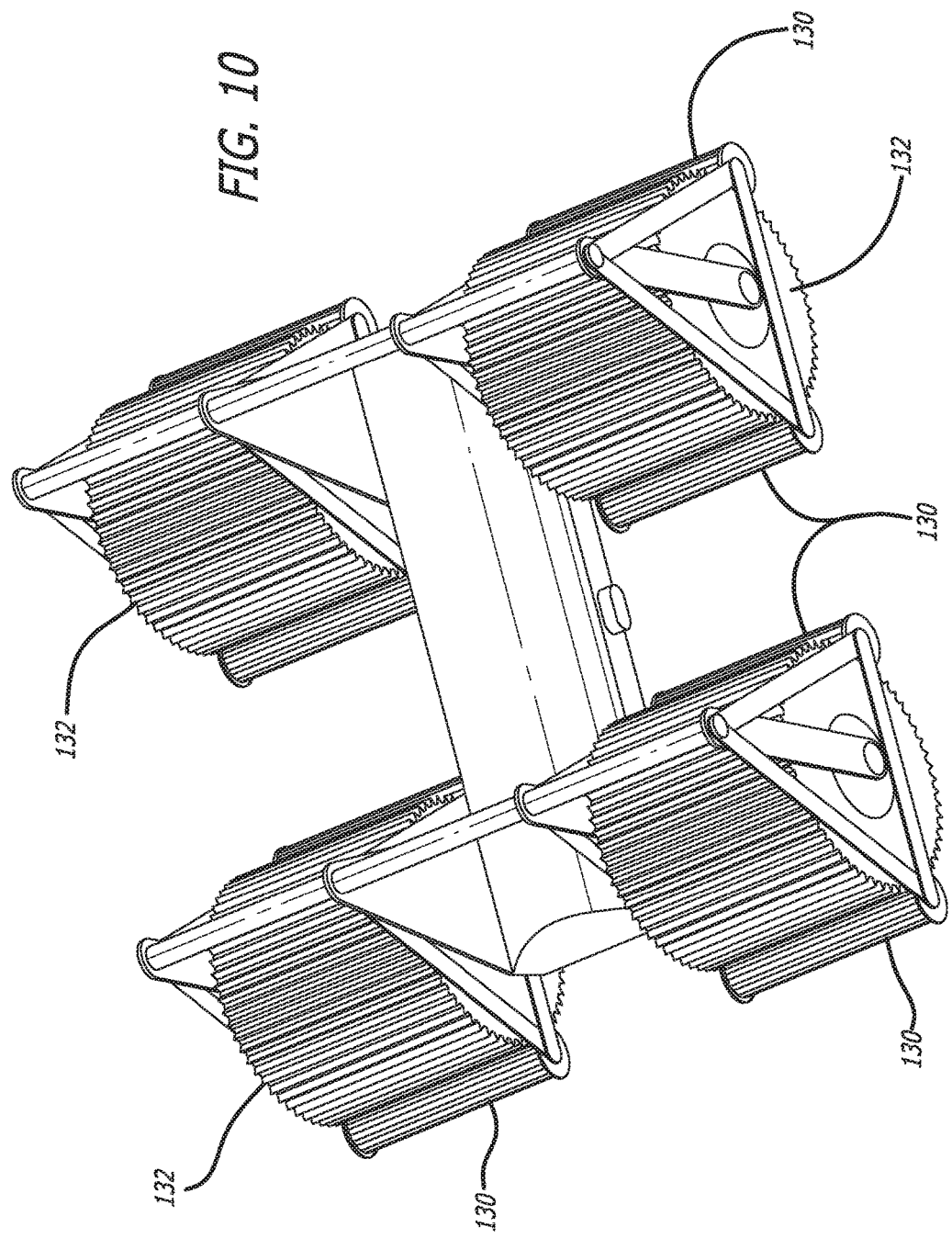

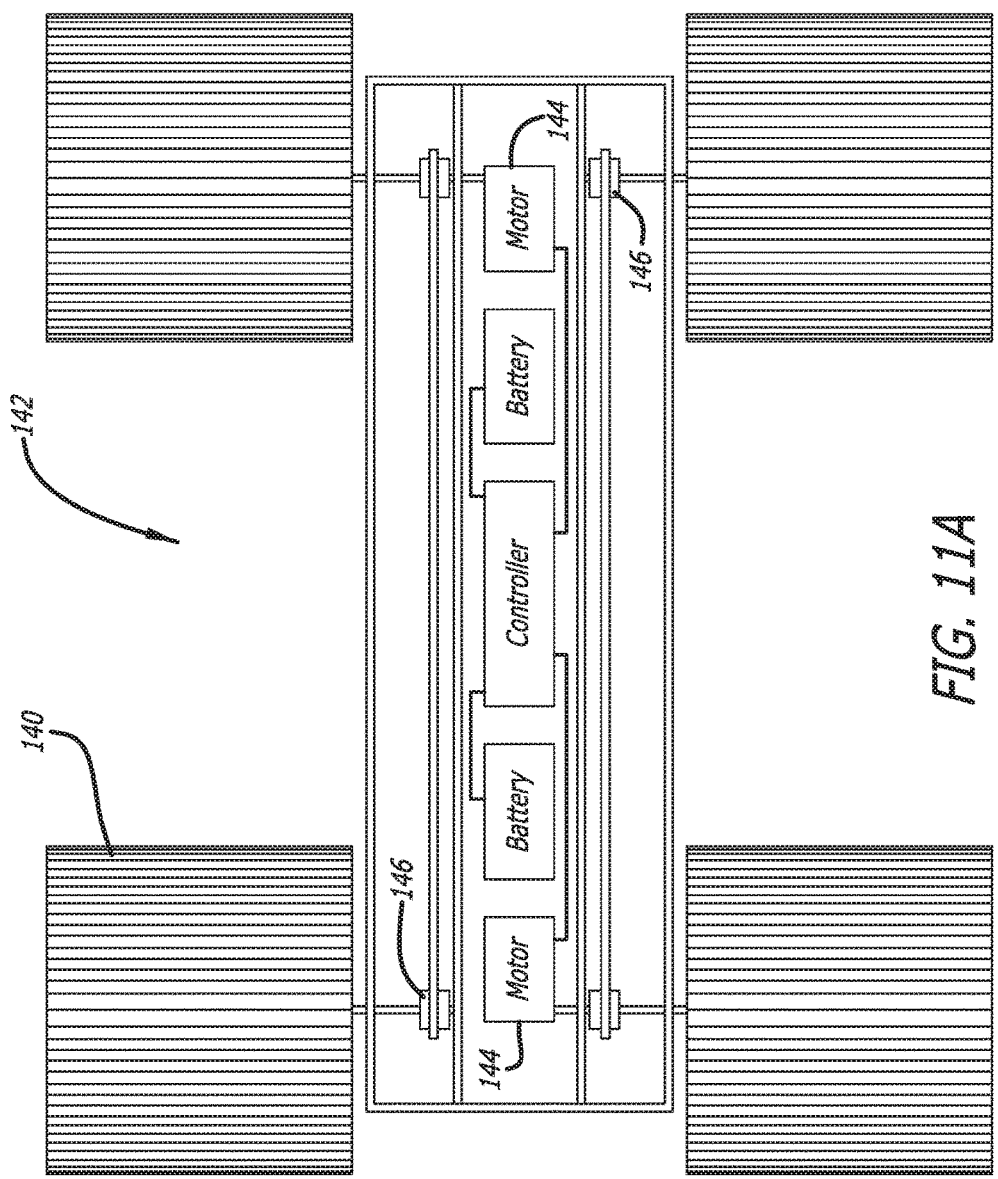

MANEUVERABLE PLATFORMS

REFERENCE TO RELATED APPLICATIONS

The present invention claims priority to U.S. Provisional Patent Application No. 62/185,423, filed, Jun. 26, 2015, the disclosure of which is incorporated herein by reference.

FIELD OF THE INVENTION

The present invention generally relates to maneuverable platforms capable of operating on both fluid bodies and land; and more particularly, to a modular floating platform configured with a plurality of buoyant members that provide propulsion, directional control, and support to the floating platform on either fluid bodies or land.

BACKGROUND

The design of buoyant watercraft has gone largely unchanged for centuries. The basic architecture of such buoyant watercraft generally includes: a hull, a propulsion system, and a steering system. In traditional buoyant watercraft, these structures are independent as are the functions that they serve to the watercraft. For example, the hulls of such watercraft comprise one or more watertight bodies that provide buoyancy to the craft while a separate propulsion system disposed within or on the hull, typically a sail, propeller or paddle drive, for example, provides propulsion to the craft. Finally, yet another separate system within or on the hull, typically a rudder or other mechanism capable of directionally controlling the propulsion of the watercraft, steers the craft. In addition to requiring three separated systems for their operation, the design of such buoyant watercraft typically restricts their operation to fluid bodies. In particular, the requirement of a single large hull makes adapting such craft for use on land impracticable.

SUMMARY OF THE INVENTION

An apparatus in accordance with embodiments of the invention implement a maneuverable platform. In embodiments, the maneuverable platform comprises an above-water platform having one or more buoyant propulsion members that work in conjunction to provide support, propulsion and steering to the platform on either fluid bodies or land.

Some embodiments are directed to maneuverable platforms including:
- a platform body defining a generally horizontal plane, the platform body being formed of at least one platform portion,
- a plurality of buoyant propulsion members disposed on the underside of the platform body, the plurality of buoyant propulsion members comprising at least one buoyant wheel each, each of the buoyant wheels comprising a cylindrical toothed body rotatable about the longitudinal axis of the cylindrical toothed body,
- wherein the buoyant propulsion members are rotatable interconnected to the platform about a vertical axis orthogonal to the longitudinal axis of the cylindrical toothed body,
- wherein the buoyant wheels are arranged in relation to the platform to provide rotational stability to the platform, and
- wherein the buoyant wheels are sufficiently buoyant such that they provide sufficient buoyant upthrust to the platform when at rest to float the platform atop a fluid body, and such that they provide dynamic buoyant lift greater than the buoyant upthrust to the platform when in motion.

In other embodiments, at least 66% of the radius of the buoyant wheels are disposed above the waterline.

In still other embodiments, the teeth of the cylindrical toothed body are formed of right-angles.

In yet other embodiments, the tangent of the outer circumference of the wheels to the surface of the water forms an angle of 45 degrees or less.

In still yet other embodiments, the teeth contact the water at an angle within 10 degrees of parallel with the mean surface of the water.

In still yet other embodiments, the teeth contact the water at an angle within 5 degrees of parallel with the mean surface of the water.

In still yet other embodiments, the platform further includes a height regulator disposed between the at least one buoyant propulsion member and the platform such that at least the buoyant wheels are movable along a vertical axis orthogonal to the horizontal plane of the platform. In some such embodiments the height regulator comprises at least two vertically movable elements interconnected on either end of the cylindrical body of the buoyant wheel such that the two ends of the cylindrical body are independently movable along a vertical axis orthogonal to the horizontal plane of the platform. In some other such embodiments the height regulator comprises at a single vertically movable element interconnected to the cylindrical body of the buoyant wheel.

In still yet other embodiments, a plurality of the buoyant wheels are rotatably interconnected to an interconnecting frame that is rotatably interconnected to the platform. In some such embodiments there four buoyant wheels are interconnected to the interconnecting frame.

In still yet other embodiments, the platform includes a plurality of detachably interconnected platform portions, wherein each platform portion comprises at least one buoyant propulsion member. In some such embodiments the plurality of detachably interconnected platform portions may be engaged and disengaged relative to each other in at least two configurations. In other such embodiments each platform can be detachably interconnected to each other platform on all sides.

In still yet other embodiments, the platform is maneuverable over at least both fluid body and solid ground.

In still yet other embodiments, each of the wheels is coated with a hydrophobic material.

In still yet other embodiments, the platform further includes at least one independently rotatable roller disposed on either side of each of the buoyant wheels such that rotation of the buoyant wheel causes rotation of the rollers. In some such embodiments the rollers comprise cylindrical toothed bodies such that they cooperatively engage the toothed bodies of the buoyant wheels.

In still yet other embodiments, the platforms further includes at least one motor mechanically engaged with each of the buoyant wheels to provide motive force thereto. In some such embodiments each of the buoyant wheels is driven by a separate motor.

Additional embodiments and features are set forth in part in the description that follows, and in part, will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description will be more fully understood with reference to the following figures which are presented as exemplary embodiments of the invention and should not be construed as a complete recitation of the scope of the invention, wherein:

FIGS. 4a and 4b illustrate a top view of a maneuverable platform portion in accordance with embodiments of the invention.

FIG. 7 illustrates a perspective view of a portion of a maneuverable platform in accordance with embodiments of the invention.

FIG. 8 illustrates a side view of the buoyant propulsion members of a portion of a maneuverable platform in accordance with embodiments of the invention.

FIG. 9 illustrates a close-up cross-sectional view of a buoyant propulsion member wheel in accordance with embodiments of the invention.

FIG. 10 illustrates a perspective view of a portion of a maneuverable platform incorporating water impeding rollers in accordance with embodiments of the invention.

FIGS. 11A and 11B illustrate a partial cross-sectional view of the mechanism of a buoyant propulsion member in accordance with embodiments of the invention.

DETAILED DESCRIPTION

Turning now to the drawings, a maneuverable platform is illustrated. In embodiments, the maneuverable platform is capable of operating on both fluid bodies (e.g., lakes, rivers, oceans, etc.) and land, including frozen fluid bodies, and comprises an above-water portion formed of one or more platform portions onto discrete sections of which are positioned a plurality of buoyant propulsion members configured to support the above-water portion and engage a fluid body or the ground to collectively provide support, propulsion and steering for the platform. The buoyant propulsion members, according to many embodiments, are configured such that they provide buoyancy to the platform when the platform is at rest and dynamic buoyant lift when the platform reaches a specified hydrodynamic speed such that the platform operates or planes atop the fluid of the fluid body during operation. In many embodiments, the maneuverable platform, including the above water portion and the buoyant propulsion members, are configured to be modular such that the platform may be split into sections of predetermined configuration to operate independently of one another.

Figure 1:
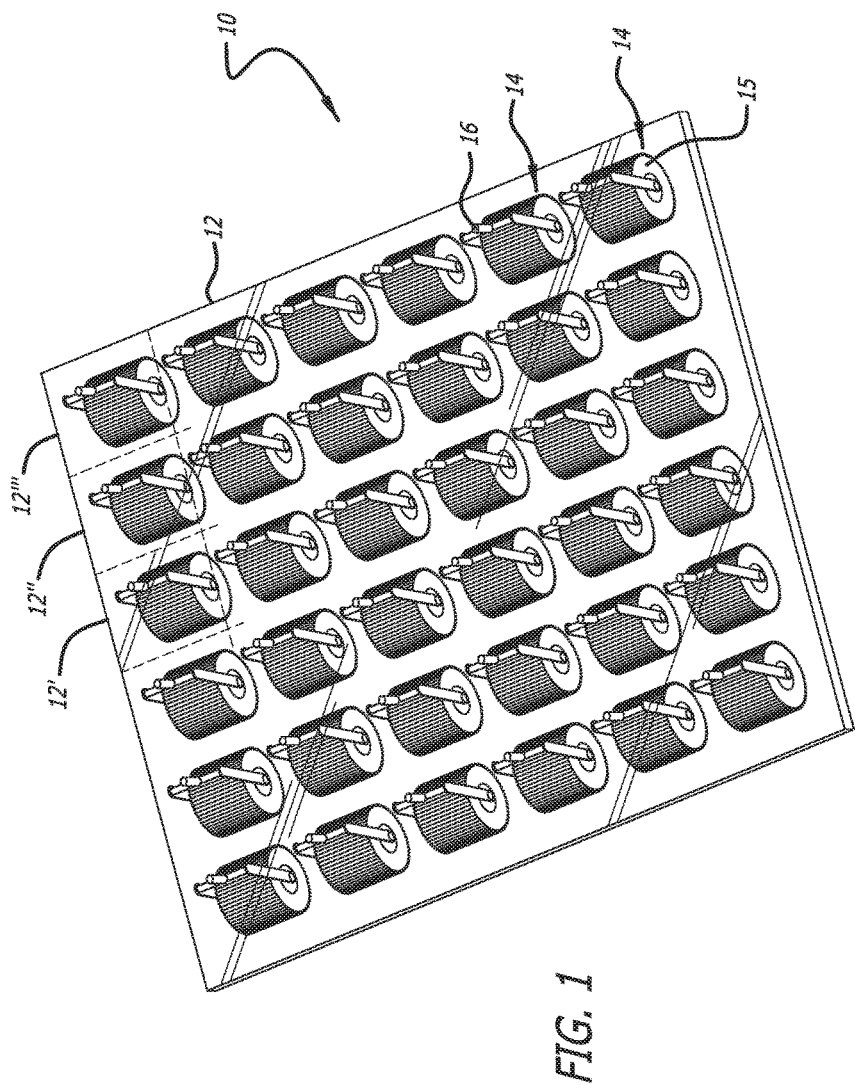
FIG. 1 illustrates a perspective view of a maneuverable platform in accordance with embodiments of the invention.

FIG. 1 provides a first view of an embodiment of a floating platform (10). As shown, in many embodiments, the platform includes one (12) or more (12', 12" and 12''') discrete platform portions or sections in association with which are disposed one or more buoyant propulsion members (14) incorporating at least one propulsive buoyant wheel (15) each. The platform portions are each configured to retain and be supported by the one or more of the buoyant propulsion members and may include suspension and steering mechanisms (16) necessary to movably interconnect one or more buoyant propulsion members to the platform and provide a control interlink thereto. As shown, the platform portions (12 or 12', 12" and 12''') may comprise one or more of such buoyant propulsion members each having at least one propulsive wheel incorporated therewith. In embodiments where the floating platform incorporates multiple platform portions (e.g., 12', 12" and 12'''), the portions may be either permanently or releasably secured together via one or more manual or automated securing mechanisms, such as, for example, clamps, brackets, braces, etc. (not shown) along with other necessary system architecture, such as, for example, electrical, signal, hydraulic, fluid, etc. subsystems, as may be known by those skilled in the art.

Although the buoyant propulsion members (14) may be disposed anywhere, and in any configuration, in conjunction with the platform portion (12) or portions (12', 12", and 12'''), in many embodiments, each portion (12', 12", 12''', etc.) is configured with a sufficient number of buoyant propulsion members having a sufficient number of buoyant wheels to allow the platform to remain buoyant when disposed within a fluid body, and such that the center of buoyancy of the platform is disposed at or sufficiently near the center of buoyancy of the platform such that the platform remains rotationally stable when disposed within a fluid body. In some embodiments, the number of buoyant propulsion wheels in a portion of the platform is at least three arranged to be generally equally spaced across the underside of the platform in a geometric configuration selected to locate the center of buoyancy within the platform or platform portion at the center point of the platform or platform portion to provide maximum rotational stability to the platform (e.g., for three members in a triangular arrangement, for four members in a square or diamond, for five members a pentagonal arrangement, etc.).

In many embodiments, the operation of the buoyant propulsion members are self-contained within the portion of the platform on which the collection of buoyant propulsion members are disposed such that the platform's operation is modular. Embodiments of such modular arrangements provide additional flexibility to the operation of such floating platforms. In particular, such modular platforms may be operated as a single integral unit or divided into a plurality of smaller units depending on the need. Alternatively, the overall geometry of the platform may be reconfigured as necessary for the particular application or geographic area. For example, a large square platform may be divided or reconfigured to reduce its width when traveling through narrower areas, such as, for example, canals. In many embodiments, the individual portion or sections of the platform may alternatively be arranged such that collections of the buoyant propulsion members operate in a cooperative manner across predefined portions of the overall floating platform.

The platform (12) and platform portions (12', 12", 12''', etc.) may be formed of any material suitable for the particular application including, plastics, metals, woods, composites, etc. In addition, the platform and platform sections may be constructed using any technique suitable to provide sufficient structural support to the platform and interconnected buoyant propulsion members. Although the platform (12) and platform portions (12', 12", 12''', etc.) shown in FIG. 1 are comprised of flat square sections, it should be understood that in some embodiments, the platform or platform portions may be formed of any suitable cooperatively interlockable geometric shape (e.g., triangles, rectangles, trapezoids, hexagons, etc.) or combination of shapes (e.g., honeycomb). In addition, any suitable or desired structures and/or mechanical apparatus may be disposed on the platform and/or platform portions, and the structures may be, themselves, either independent or formed from separate interlocking sections. Such structures and apparatus could be incorporated into the embodiments and arranged as otherwise described herein to provide specific functionality to the platforms (10).

Figure 2:
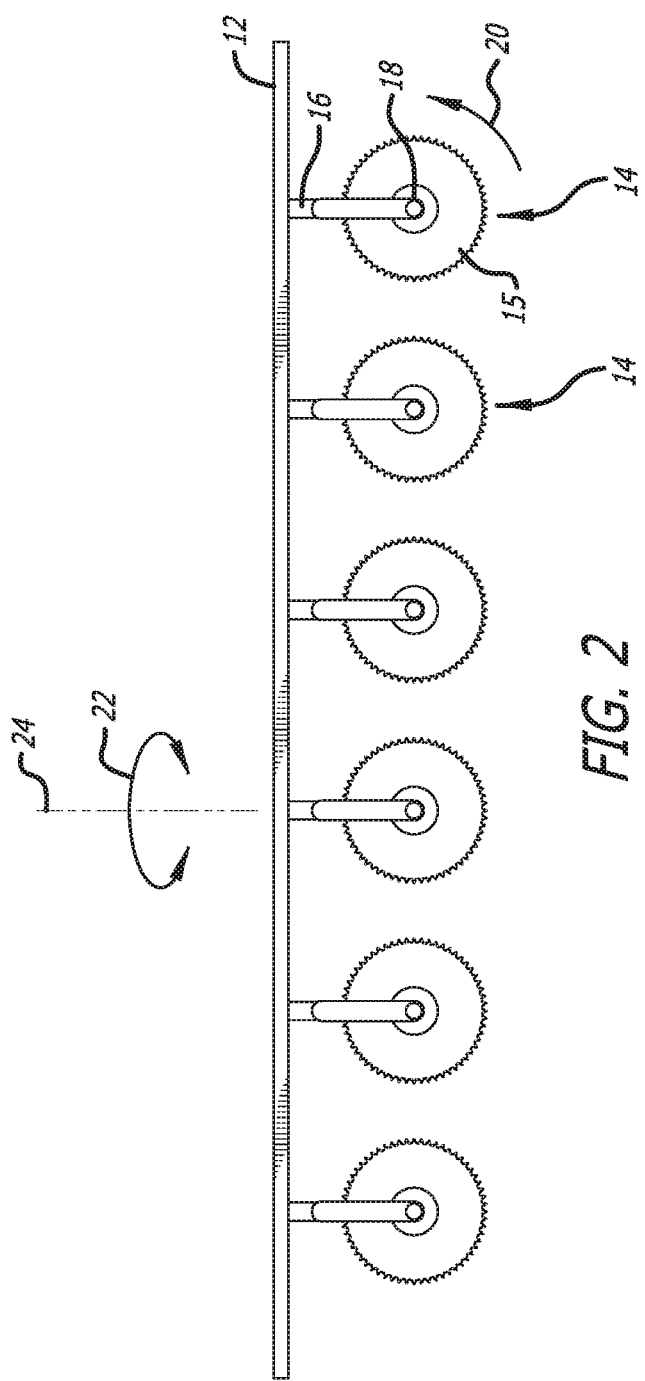
FIG. 2 illustrates a side view of a maneuverable platform in accordance with embodiments of the invention.

The interconnection of embodiments of the buoyant propulsion members and their cooperative operation are shown in FIGS. 2 to 6. As shown in FIG. 2, a plurality of the buoyant propulsion members (14) are attached to an underside of the platform structure (12) in a desired configuration in accordance with the considerations described above. Each of the buoyant propulsion members is attached to the platform via one or more buoyant propulsion member assemblies (16). The assemblies (16) are in supportive relation with an axle (18) disposed through the center of each of the wheels of the buoyant propulsion members and about which the buoyant wheels (15) of the buoyant members (14) are rotatable (20). The rotation of the wheels of the buoyant propulsion members about these axle axes provides the basic propulsion to the platform. As will be described in greater detail below, one or more motors, hydraulic systems or other manual or automated power systems may be provided in conjunction with the buoyant propulsion members (14) to provide the propulsion motive force to drive the wheels of the buoyant propulsion members about their axles. Each of the buoyant propulsion members may be provided with one or more of these propulsion power systems configured to drive only a single wheel of that member, or each of the power systems may be disposed and configured to drive a plurality of the wheels collectively. In addition, in some embodiments, the modular nature of the propulsion power system allows the various wheels of the buoyant propulsion members to be driven with different motive force characteristics (e.g., at different speeds and/or at different torques) such that fine control over the speed of the platform may be provided.

In addition to providing a supportive interconnection to the wheels of the buoyant propulsion members through the axles thereof, these assemblies (16) also support and interconnect each of the buoyant propulsion members in an off-axle axis rotative relationship such that each of the buoyant propulsion members are rotatable (22) around a vertical axis (24) disposed orthogonal to one or both the axle axis (18) and the horizontal plane of the platform (12). Although not shown, one or more motors, hydraulic systems or other manual or automated directional power systems may be provided in conjunction with the assemblies (16) to provide the motive force to rotate the buoyant propulsion members about their vertical axis (24). Each of the assemblies may be provided with one or more of these directional power systems configured to drive only that single assembly or a single wheel of that assembly, or each of the power systems may be disposed and configured to drive a plurality of the assemblies or assembly wheels collectively. As will be discussed in greater detail below, in some embodiments the modular nature of the directional power system allows the various wheels of the buoyant propulsion members to be directed in different directions (e.g., such that they deliver their propulsive force along different axes relative to the platform) such that fine control over the directional movement of the platform may be provided.

Figure 3:
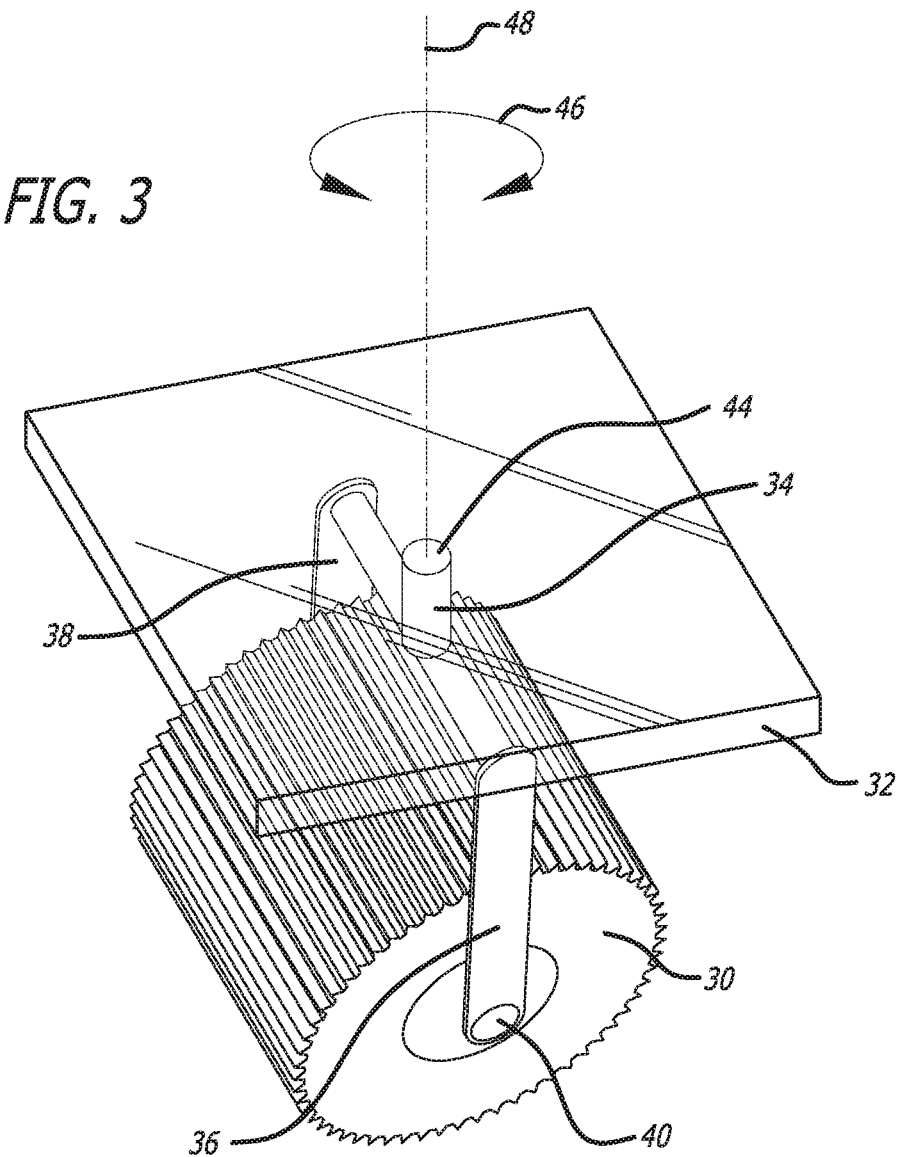
FIG. 3 illustrates a perspective view of a portion of a maneuverable platform in accordance with embodiments of the invention.

In many embodiments, each of the buoyant propulsion members or wheels of the members is independently rotatable relative to all other buoyant propulsion members. In some such embodiments, as shown in FIG. 3, each of the wheels (30) of the buoyant propulsion members are interconnected to a portion of the platform (32) by a separate buoyant propulsion assembly (34). In some embodiments, the buoyant propulsion assembly (34) comprises a pair of arms (36 & 38) configured to engage the ends of the buoyant propulsion wheel axle (40) in a rotative relationship (i.e., such that the wheel of the buoyant propulsion member may freely rotate about its axis when required and directed). It should be understood that in other embodiments, only a single end of the axle need be thus engaged by the assembly (34). In addition, although the embodiments shown in FIG. 3 show a single point (44) of interconnection between the assembly and the platform, it should be understood that multiple points may be thus interconnected as long as the assembly provides a rotative coupling between the buoyant propulsion member and the platform such that the buoyant propulsion member may be rotated (46) about a vertical axis (48) orthogonal to the axle axis. As discussed above, in many embodiments, the assembly may further interconnect power and control systems as necessary to provide motive power to the buoyant propulsion members to allow for the buoyant propulsion members to provide both propulsion and steering functions to the platform.

Figure 4A:
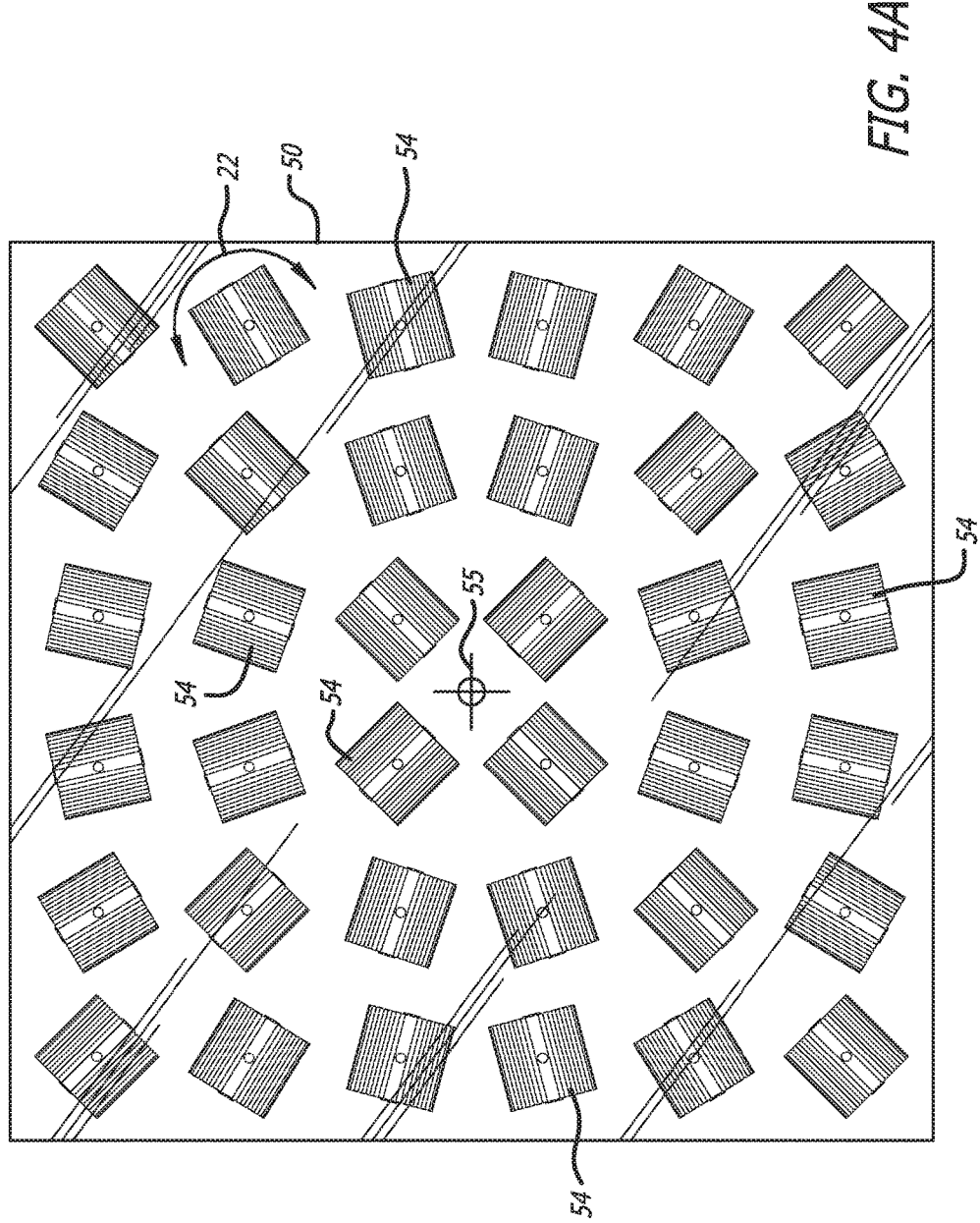

According to many embodiments, during operation, as shown in FIGS. 4A and 4B, the plurality of buoyant propulsion members may be individually (FIG. 4A) or collectively (FIG. 4B) controlled to provide directional control of the platform. The modular nature of the directional propulsion provided by the buoyant propulsion members, according to embodiments thereby, provides unlimited flexibility in the directional control of the platform. As shown in FIG. 4A, in some situations, such as when there is a desire to rotate the entire platform (50) about an axis, or when an outside force such as a wind or water current requires an off-axis correction to the course of the platform, the buoyant propulsion members (54) may be directed in different directions to provide a multi-directional propulsive force to the platform. In many such embodiments, the collective movement of the propulsion member (54) may be defined with reference to a pivot point (55) about which the propulsion members are configured to rotate or otherwise move the platform. As shown in FIG. 4A, the pivot point may be defined as the point at which the wheels' axles of the propulsion members (54) are pointed when the platform is in a pivot or turning steering mode. In other words, when the platform is arcing in its trajectory, a virtual pivot point is defined. As shown in FIG. 4A, if the pivot point is somewhere within the perimeter of the platform, some of the wheels will roll in opposite directions to cause the platform to rotate around the pivot point. However, if the virtual pivot point is somewhere outside the perimeter of the platform, all wheels will rotate in the same direction although their speeds may vary, as required, depending on their distance from the pivot point. In such embodiments, the farther away from the platform a virtual pivot point is, the wider the arc of the turn is and the more parallel the axles and the more similar their rolling speeds become. Utilizing these principles of collective operation provide the steering dynamics of the platforms according to embodiments. Although the above discussion has focused on a single virtual pivot point it should be understood that the pivot point may be made to dynamically move closer and farther away to accommodate the ever-changing steering direction operational requirements. Regardless of the steering motion chosen, defining the pivot point and/or providing appropriate guidance to the propulsion members may, in many embodiments, be controlled by a central steering computer, as will be understood by those skilled in the art.

Alternatively, the buoyant propulsion members (54) may be collectively turned in a single direction (56) such that the combined propulsive force of all the buoyant propulsion members is directed along a single axis (58), as shown in FIG. 4B. Such collective control of the propulsive/directional output of the buoyant propulsion members can provide unparalleled speed and control of the movement of the maneuverable platform.

Although the above discussion has focused on the directional control of the platforms via the collective control of the direction and speed of the buoyant propulsion members, additional degrees of freedom may be provided to the buoyant propulsion member to control the height of the wheels relative to the platform. As discussed, embodiments of the maneuverable platforms are configured to travel over both land and fluid bodies (in either solid or liquid phase). In either case, a change in the height of one portion of the land or fluid body under the platform relative to another portion of the land or fluid body under the platform may cause the horizontal plane of the platform to tip or shift. In many embodiments, as shown schematically in FIG. 5, each of the buoyant propulsion members (60) is further provided with a height regulator (62) configured to allow for the movement of at least the wheels (63) of the buoyant propulsion members along a vertical axis (64) orthogonal to the wheel axle (65) and, in many embodiments, the plane of the platform (66). In some embodiments, the height regulator (62) may be a passive device, such as a hydraulic piston or spring that applies a steady-state downward pressure on the buoyant propulsion member such that the buoyant propulsion member may be urged upward when encountering an obstacle (e.g. uneven terrain or obstacle) or a change in the terrain contour (e.g., a wave) and then return to its original position under the motive force of the height regulator such that the height of the platform relative to the underlying terrain remains substantially unchanged. In other embodiments, the height regulator (63) may be a dynamic device, such as an active hydraulic system or an electric motor, that can actively maneuver the buoyant propulsion member up or down along the vertical axis (64) as desired to adjust the height of the platform relative to the underlying terrain. In addition, many embodiments may have combined dynamic and passive height regulators interconnected between each of the buoyant propulsion members and the platform. Such systems can be further computer controlled to provide automated operation of such height regulators.

Figure 5:
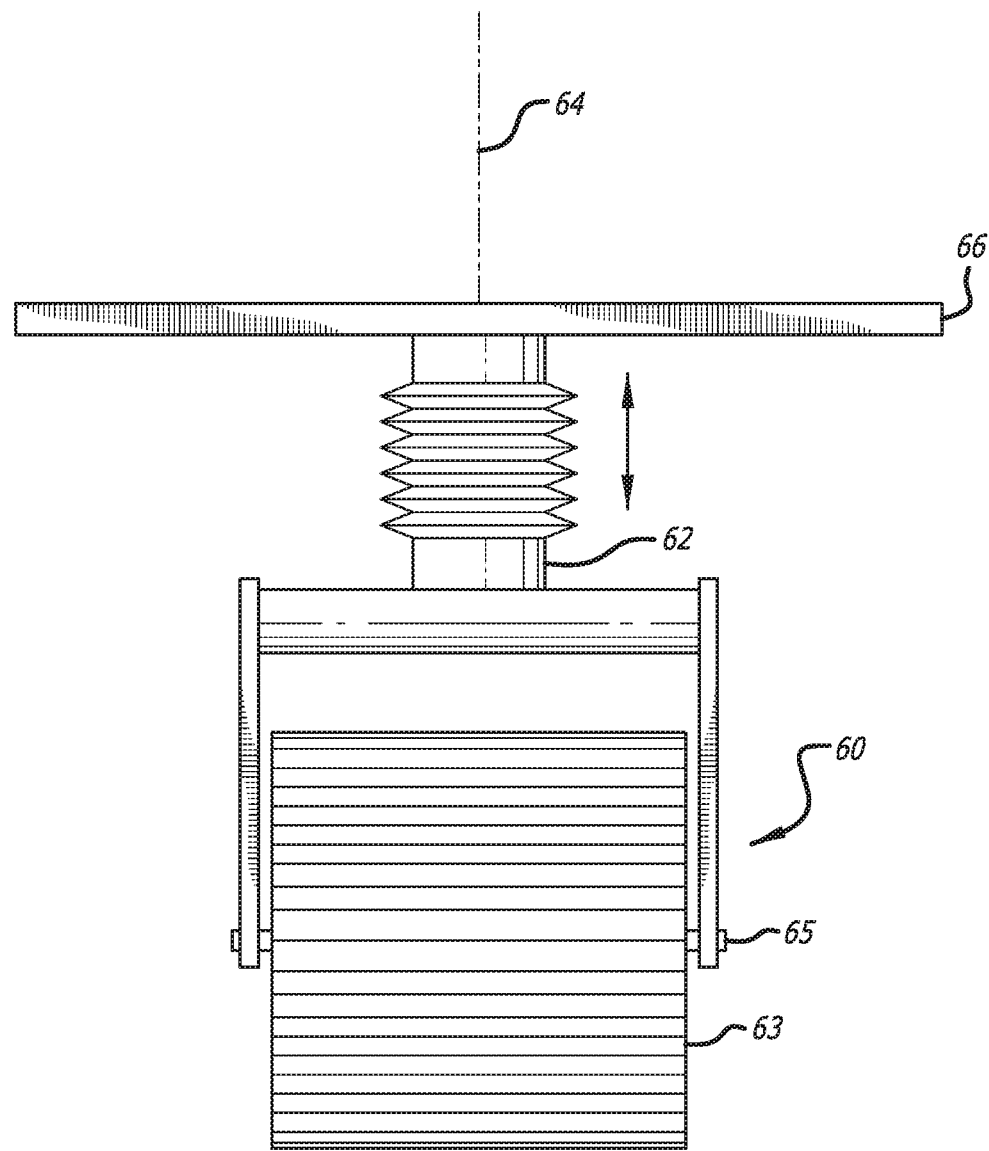
FIG. 5 illustrates a front view of a buoyant propulsion member in accordance with embodiments of the invention.
Figure 6A:
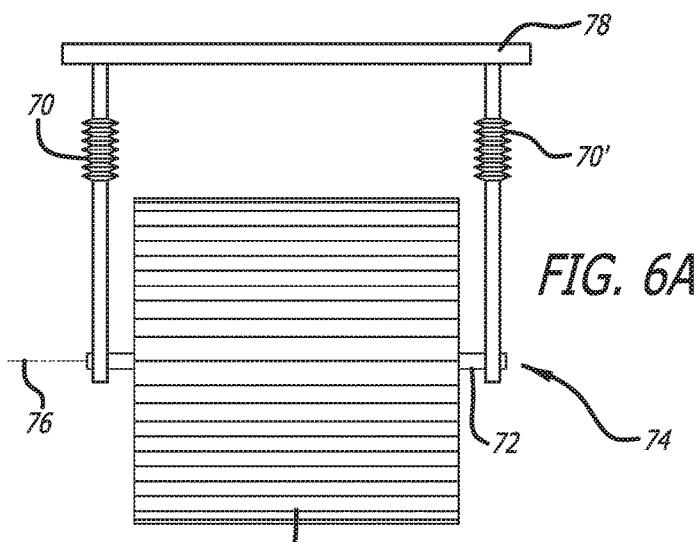
FIGS. 6A to 6C illustrate a front view of a buoyant propulsion member in accordance with embodiments of the invention.
Figure 6B:
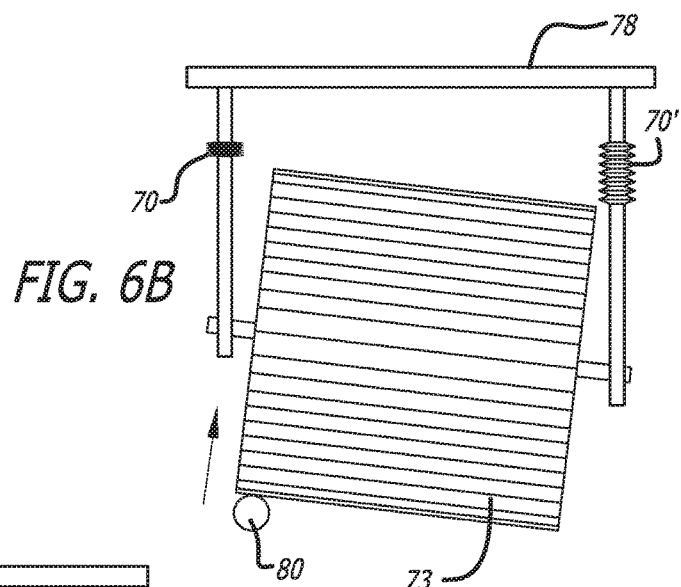
Figure 6C:
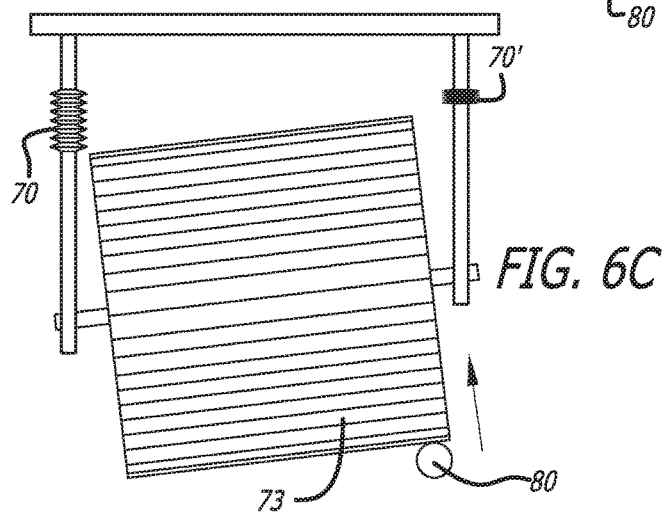

Although the embodiment of the height regulator provided in FIG. 5 shows a single height regulator for each buoyant propulsion member, it will be understood that multiple height regulators might be provided for each member. In addition, in embodiments as shown in FIGS. 6A to 6C, these height regulators (70 & 70') may be provided on either side of the axle (72) of the wheels (73) of the buoyant propulsion members (74) such that the axis (76) of the axle may also be tilted relative to the horizontal plane of the platform (78). Such embodiments provide an extra degree of freedom to the movement of the members such that an obstacle (80) or change in terrain height that effects the height of the buoyant propulsion member relative to the platform in a non-uniform manner across the length of the buoyant propulsion member may also be corrected for without impacting the disposition of the platform relative to the terrain in question. As discussed above, such embodiments of height regulators may incorporate either passive or dynamic control systems. In many embodiments, multiple embodiments of height regulators may be combined. In some embodiments, a single height regulator (as shown in FIG. 5) may be combined with a multiple point height regulator (as shown in FIGS. 6A to 6C) to provide additional degrees of freedom to the position of the buoyant propulsion member relative to the platform.

Although not described above, it should be understood that one function for such height regulators is to provide buoyancy control to the platform when disposed on a body of water. For example, in embodiments where each of the buoyant propulsion members is provided with a height regulator, it is possible to dynamically and/or passively control the height of the members relative to the platform to compensate the platform for an incoming wave or swell thereby preventing rocking or listing of the plane of the platform.

Although the above discussion has focused on embodiments of platforms or platform portions where the buoyant propulsion members incorporate a single buoyant wheel, it should be understood that such members may incorporate a plurality of buoyant wheels, as shown in FIG. 7. In such embodiments, the plurality of buoyant wheels may be interconnected by any suitable method. In the embodiment provided in FIG. 7, the buoyant propulsion member (82) comprises a plurality of buoyant wheels (84) that are interconnected by an interconnecting frame (86) to the platform (88). In such an embodiment, the buoyant wheels may be driven by a single motor that is interconnected to the plurality of wheels, or each wheel may be independently driven, or a combination thereof. In addition, as shown, each of the wheels may be provided with a separate rotating axle (90) and may include separate axle support structures (92) that may, in turn, be provided with height regulators (not shown) as described above. Alternatively, multiple wheels may share a common axle or a common height regulation device. Although in the embodiment shown in FIG. 7, a single interconnection point (94) is provided between the buoyant propulsion member and the platform such that the directional control of the wheels of the member would be collective, it will be understood that any number of interconnection points may be provided and any number of directional control mechanisms may be provided. In addition, the height regulation of the entire member may be collectively controlled, or each of the wheels of the member may be controlled separately, using the mechanisms for regulating height between the platform and buoyant propulsion members described above.

Turning to the construction of the buoyant propulsion members (98) and wheels (100), as shown in FIG. 8, regardless of the number of wheels, each wheel is configured to rotate (102) about an axle (104) to provide propulsive force to the platform. The direction of rotation of the wheels of such embodiments is reversible such that the wheels may rotate in either direction. In many embodiments each of the wheels comprises a toothed cylinder having a coaxial axis (106) that runs along the axle (104) thereof. The wheels may be a hollow or solid body formed of any material that is inherently buoyant, such as for example, a polymeric or natural foam, wood, fiber, plastic, etc. Specific examples of such materials include closed-cell polymer foams such as polyethylene foams, lightweight wood such as balsa wood treated with super hydrophobic coating to prevent waterlogging, and/or styrene or Styrofoam, either by itself or rubber coated. In some embodiments, the wheels are formed of a solid polymeric foam having a hydrophobic coating disposed on the outer surface, thereof, to prevent a fluid from being carried up over the top of the wheel, or contaminants from adhering to the wheel, during operation. Suitable hydrophobic materials may include, for example, Hydrobead™ made by Hydrobead of La Jolla, Calif.

Regardless of the material chosen, as previously discussed, the wheels of the buoyant propulsion members are configured to support the platform by two mechanisms, (1) collective buoyancy when the platform is at rest and (2) lift by dynamic buoyancy when the platform is in motion. In particular, in many embodiments, when the platform is in motion, the upward force on the platform from the lift generated by the propulsive wheels exceeds the upward force on the platform from the buoyancy upthrust generated by the wheels, allowing the platform to plane or travel atop the fluid body. To provide static buoyancy in accordance with embodiments, the wheels are formed of a materials and are dimensioned (e.g., length along the axle axis and diameter) such that the upward buoyancy force acting collectively on the wheels of the platform is greater than the downward force being applied by the weight of the platform on the buoyant wheels of the platform, as may be calculated by means known to those skilled in the art. To provide dynamic buoyancy or a dynamic buoyancy lift when the platform is in motion such that the supportive force provided by the lift generated by the wheels exceeds the buoyant force provided by the wheels in accordance with embodiments, in some embodiments, the wheels (110) are formed of a material that is sufficiently lightweight such that when immersed in water under the weight of the platform and all requisite supportive and drive mechanisms, at least 66% (112) of the wheel's radius is above the water line (114), as shown in FIG. 9. In other embodiments, as also shown in FIG. 9, the tangent (116) at the point where the wheel's outer circumference (118) meets the water (114) measures approximately 45 degrees, or less, to the surface of the water. Embodiments consistent with these geometric constraints allow for the generation of a dynamic buoyant lift on the platform under standard operating conditions (e.g., when the platform is in motion).

As shown in FIG. 9, in many embodiments, the wheel's outer circumference is comprised of sawtooth-shaped teeth (120) running coaxially along the longitudinal axis of the cylindrical wheel. In some embodiments, to further encourage the generation of dynamic buoyancy lift during motion of the platform, the two facets of each gear tooth, viewed from an axial perspective, are at right angles to each other (122) such that during wheel rotation, each gear tooth at the leading edge contacts the water with its downward-facing facet approximately parallel with the water's mean surface (124) (i.e., within 5 to 10 degrees). This is advantageous according to some embodiments because in such a geometry as the tooth enters the water, the water cannot compress downward. Accordingly, in order to allow the tooth to enter the water, the water is forced to move laterally. The rate at which a heavy object sinks in water depends on how quickly the water directly under the object can move laterally out of the way of the descending object. Accordingly, in such embodiments, when the velocity of the impact of the wheels in accordance with embodiments exceeds the velocity of water's lateral movement, the dynamics between the object and the liquid change, the water begins to take on the functional characteristics of a solid, and the amount of dynamic buoyancy lift generated by the wheels exceeds the upthrust contribution from the buoyancy of the wheels such that the platform planes or rides atop the fluid surface. As shown by the arrows along the teeth (120) of the wheel (110) in FIG. 9, during operation, each tooth takes on a different function as rotation forces it deeper into the water. Where each tooth initially pushes the wheel upward (124), as it rotates toward the bottom of the rotational cycle and beyond to finally exit the water, it pushes against the water in an increasingly horizontal vector to move the wheel forward (126). The combination of upward and forward vectors in accordance with the embodiments of the wheels having such a tooth design generates dynamic buoyancy lift and causes the wheel to climb upward and forward out of the water thus allowing the platform to plane over the surface of the water instead of riding through the water. It will be understood that for the purposes of these embodiments, planing, hydroplaning, or riding atop the surface of the water occurs when greater than 66% of the wheel's radius is above the water line at the moment wheel rotation begins.

In many embodiments, the length along the axis of the wheels is approximately equal to the diameter of the wheel. However, it should be understood that the wheels may be sized (e.g., length and diameter) as needed with reference to the weight and size of the platform to be supported, the inherent buoyancy of the material of the wheels, and the number of wheels provided such that sufficient buoyancy and dynamic buoyancy lift is imparted to the platform during operation.

Although embodiments are provided wherein a hydrophobic coating or materials are used to prevent fluids from gathering in the teeth and flowing over the top of the wheels during operation, in other embodiments, mechanical means can be employed to ensure fluid does not flow up the wheels as they rotate. One embodiment, shown in FIG. 10, provides such an embodiment. As shown, in such an embodiment, rotatable rollers (130) are provided on either side of each of the wheels (132) such that water captured in the teeth of the wheels would be prevented from flowing beyond the rollers. Although single rollers on either side of the wheels are shown in the exemplary embodiments, it should be understood that any number and configuration of rollers may be used to prevent the flow of water or other fluids over the wheels during operation. The rollers may, themselves, be made of any material suitable for impeding the flow of fluids over the wheels including, for example, polymer materials, foams, wood, metal etc.

Figure 11B:
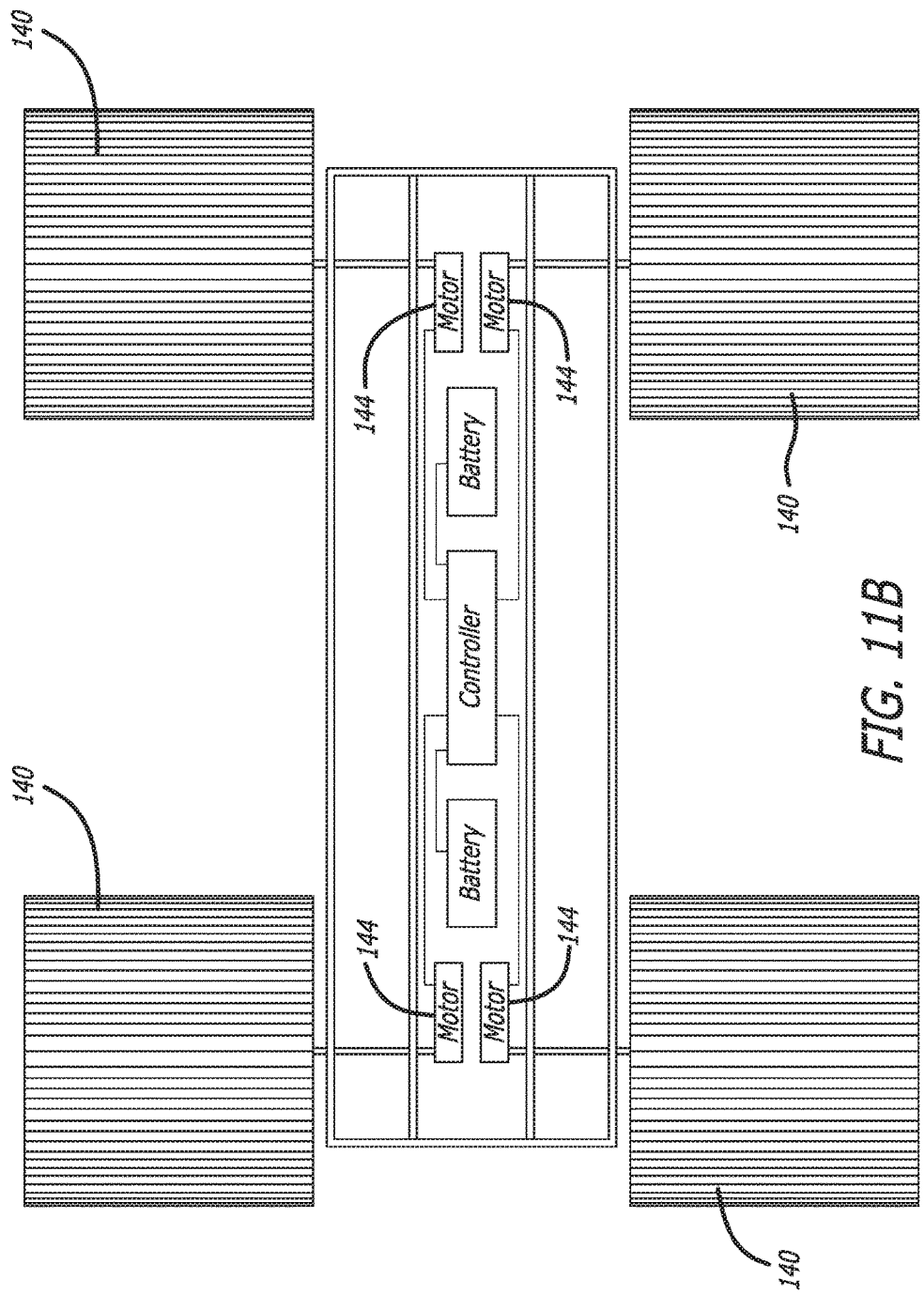

Although many configurations of motors and control electronics for providing propulsive force and signal control to the buoyant propulsion members may be utilized with the platforms, FIGS. 11A and 11B provide diagrams of some exemplary embodiments. As shown in FIG. 11A, in some embodiments, one or more of the wheels (140) of the member (142) may be collectively controlled by a single motor (144). In such embodiments, drive elements (146) for transmitting the motive force from the single motor to the multiple wheels may be provided. Such drive elements may include any mechanism capable of distributing the motive force including axles, transmissions, chains, belts, etc. Although two motors are shown in FIG. 11A, it should be understood that in accordance with embodiments, any number of motors may be incorporated to distributively transmit force to the wheels, including a single motor. Alternatively, as shown in FIG. 11B, in other embodiments, each wheel (140) may be provided with a separate motor (144) such that the speed and direction of rotation of each wheel could be controlled independently. Although certain arrangements of batteries and controllers are provided in FIGS. 11A and 11B, it will be understood that these elements are only provided as examples and that any number and arrangement of controllers and power devices may be provided. For example, in many embodiments, each of the motors could have a separate controller, or all the motors of the platform could be controlled centrally. Likewise, although batteries are shown in the embodiments, it will be understood that any suitable power source may be used to provide energy to the motors, including central electrical power plants and non-electrical sources. For example, in some embodiments, the motors could derive their energy from combustion sources.

Finally, although specific embodiments of a platform are formed, it will be understood that other elements may be included into such platforms without altering its overall functions. For example, additional fasteners or other hardware may be included to secure the platform in its various configurations. Likewise, the platform itself may take any shape and form suitable to the particular functions. In addition, it should be understood that while the discussion has focused on the challenges of operating on a fluid body, the platforms and wheels of said platforms are contemplated for use on fluid bodies (either in a liquid or solid phase such as ice) and solid ground and that apart from considerations of buoyancy unique to operating on fluid bodies, all other configurational and operational considerations apply to either terrain type.

The above disclosure provides figures and schematics for platforms capable, in certain embodiments, of operating as all-terrain platforms for use in commercial, personal, leisure, sport and military applications, etc.

Doctrine of Equivalents

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is, therefore, to be understood that the present invention may be practiced otherwise than specifically described. Thus, embodiments of the present invention should be considered in all respects as illustrative and not restrictive.

What is claimed is:

1. A maneuverable platform comprising:
   a platform body defining a generally horizontal plane, the platform body being formed of at least one platform portion;
   a plurality of buoyant propulsion members disposed on the underside of the platform body, the plurality of buoyant propulsion members comprising at least one buoyant wheel each, each of the buoyant wheels comprising a cylindrical toothed body rotatable about the longitudinal axis of the cylindrical toothed body;
   wherein the buoyant propulsion members are rotatably interconnected to the platform about a vertical axis orthogonal to the longitudinal axis of the cylindrical toothed body;
   wherein the buoyant wheels are arranged in relation to the platform to provide rotational stability to the platform; and
   wherein the buoyant wheels are sufficiently buoyant such that they provide sufficient buoyant upthrust to the platform when at rest to float the platform atop a fluid body, and such that, when in motion, they provide dynamic buoyant lift greater than the buoyant upthrust to the platform; and
   further comprising a height regulator disposed between the at least one buoyant propulsion member and the platform such that at least the buoyant wheels are movable along a vertical axis orthogonal to the horizontal plane of the platform, and wherein the height regulator comprises at a single vertically movable element interconnected to the cylindrical body of the buoyant wheel.

2. The maneuverable platform of claim 1, wherein at least 66% of the radius of the buoyant wheels are disposed above the waterline.

3. The maneuverable platform of claim 1, wherein the teeth of the cylindrical toothed body are formed of right-angles.

4. The maneuverable platform of claim 1, wherein the tangent of the outer circumference of the wheels to the surface of the water forms an angle of 45 degrees or less.

5. The maneuverable platform of claim 1, wherein the teeth contact the water at an angle within 10 degrees of parallel with the mean surface of the water.

6. The maneuverable platform of claim 1, wherein the teeth contact the water at an angle within 5 degrees of parallel with the mean surface of the water.

7. The maneuverable platform of claim 1, wherein the height regulator comprises at least two vertically movable elements interconnected on either end of the cylindrical body of the buoyant wheel such that the two ends of the cylindrical body are independently movable along a vertical axis orthogonal to the horizontal plane of the platform.

8. A maneuverable platform comprising:
   a platform body defining a generally horizontal plane, the platform body being formed of at least one platform portion;
   a plurality of buoyant propulsion members disposed on the underside of the platform body, the plurality of buoyant propulsion members comprising at least one buoyant wheel each, each of the buoyant wheels comprising a cylindrical toothed body rotatable about the longitudinal axis of the cylindrical toothed body;
   wherein the buoyant propulsion members are rotatably interconnected to the platform about a vertical axis orthogonal to the longitudinal axis of the cylindrical toothed body;
   wherein the buoyant wheels are arranged in relation to the platform to provide rotational stability to the platform; and
   wherein the buoyant wheels are sufficiently buoyant such that they provide sufficient buoyant upthrust to the platform when at rest to float the platform atop a fluid body, and such that, when in motion, they provide dynamic buoyant lift greater than the buoyant upthrust to the platform;
   wherein a plurality of the buoyant wheels are rotatably interconnected to an interconnecting frame that is rotatably interconnected to the platform.

9. The maneuverable platform of claim 8, wherein four buoyant wheels are interconnected to the interconnecting frame.

10. A maneuverable platform comprising:
    a platform body defining a generally horizontal plane, the platform body being formed of at least one platform portion;
    a plurality of buoyant propulsion members disposed on the underside of the platform body, the plurality of buoyant propulsion members comprising at least one buoyant wheel each, each of the buoyant wheels comprising a cylindrical toothed body rotatable about the longitudinal axis of the cylindrical toothed body;

wherein the buoyant propulsion members are rotatably interconnected to the platform about a vertical axis orthogonal to the longitudinal axis of the cylindrical toothed body;

wherein the buoyant wheels are arranged in relation to the platform to provide rotational stability to the platform; and wherein the buoyant wheels are sufficiently buoyant such that they provide sufficient buoyant upthrust to the platform when at rest to float the platform atop a fluid body, and such that, when in motion, they provide dynamic buoyant lift greater than the buoyant upthrust to the platform; and further comprising a plurality of detachably interconnected platform portions, wherein each platform portion comprises at least one buoyant propulsion member.

11. The maneuverable platform of claim 10, wherein the plurality of detachably interconnected platform portions may be engaged and disengaged relative to each other in at least two configurations.

12. The maneuverable platform of claim 10, wherein the each platform can be detachably interconnected to each other platform on all sides.

13. The maneuverable platform of claim 1, wherein the platform is maneuverable over at least both fluid body and solid ground.

14. The maneuverable platform of claim 1, wherein each of the wheels is coated with a hydrophobic material.

15. A maneuverable platform comprising:

a platform body defining a generally horizontal plane, the platform body being formed of at least one platform portion;

a plurality of buoyant propulsion members disposed on the underside of the platform body, the plurality of buoyant propulsion members comprising at least one buoyant wheel each, each of the buoyant wheels comprising a cylindrical toothed body rotatable about the longitudinal axis of the cylindrical toothed body;

wherein the buoyant propulsion members are rotatably interconnected to the platform about a vertical axis orthogonal to the longitudinal axis of the cylindrical toothed body;

wherein the buoyant wheels are arranged in relation to the platform to provide rotational stability to the platform; and wherein the buoyant wheels are sufficiently buoyant such that they provide sufficient buoyant upthrust to the platform when at rest to float the platform atop a fluid body, and such that, when in motion, they provide dynamic buoyant lift greater than the buoyant upthrust to the platform; and further comprising at least one independently rotatable roller disposed on either side of each of the buoyant wheels such that rotation of the buoyant wheel causes rotation of the rollers.

16. The maneuverable platform of claim 15, wherein the rollers comprise cylindrical toothed bodies such that they cooperatively engage the toothed bodies of the buoyant wheels.

17. The maneuverable platform of claim 1, further comprising at least one motor mechanically engaged with each of the buoyant wheels to provide motive force thereto.

18. A maneuverable platform comprising:

a platform body defining a generally horizontal plane, the platform body being formed of at least one platform portion;

a plurality of buoyant propulsion members disposed on the underside of the platform body, the plurality of buoyant propulsion members comprising at least one buoyant wheel each, each of the buoyant wheels comprising a cylindrical toothed body rotatable about the longitudinal axis of the cylindrical toothed body;

wherein the buoyant propulsion members are rotatably interconnected to the platform about a vertical axis orthogonal to the longitudinal axis of the cylindrical toothed body;

wherein the buoyant wheels are arranged in relation to the platform to provide rotational stability to the platform; and wherein the buoyant wheels are sufficiently buoyant such that they provide sufficient buoyant upthrust to the platform when at rest to float the platform atop a fluid body, and such that, when in motion, they provide dynamic buoyant lift greater than the buoyant upthrust to the platform; and wherein each of the buoyant wheels is driven by a separate motor.

* * * * *